J. S. ANDERSON.
HOSE CLAMP.
APPLICATION FILED JAN. 9, 1922.
1,435,684.
Patented Nov. 14, 1922.
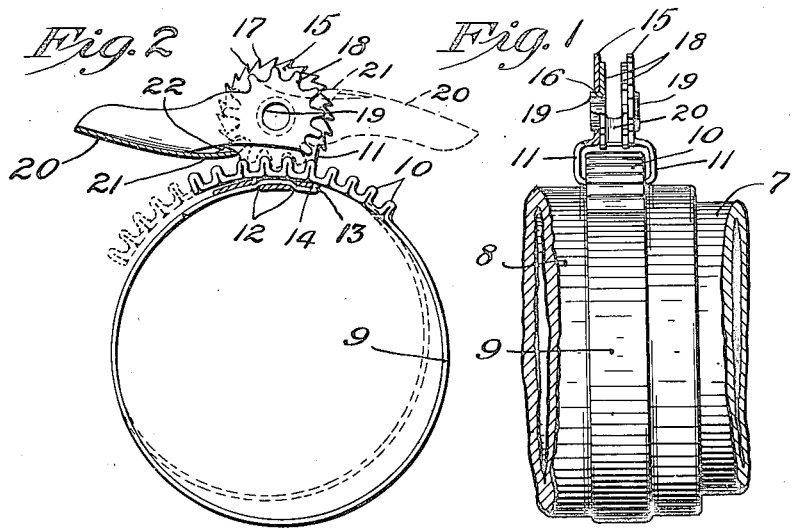
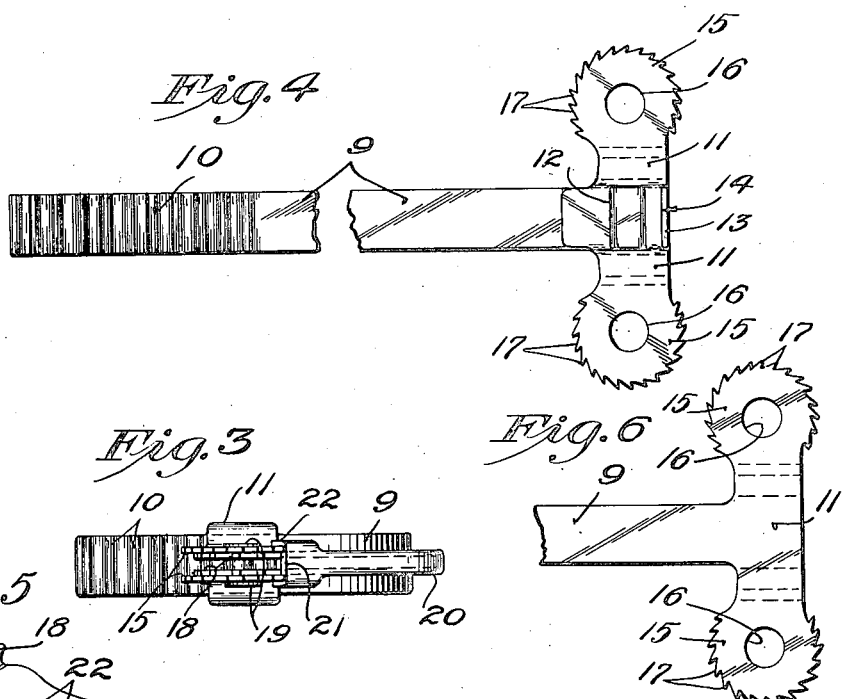
Inventor
John Severin Anderson
By his Attorneys
Merchant and Kilgore Patented Nov. 14, 1922.

1,435,684

UNITED STATES PATENT OFFICE.

JOHN SEVERIN ANDERSON, OF CANBY, MINNESOTA.

HOSE CLAMP.

Application filed January 9, 1922. Serial No. 527,870.

*To all whom it may concern:*

Be it known that I, JOHN SEVERIN ANDERSON, a citizen of the United States, residing at Canby, in the county of Yellow Medicine and State of Minnesota, have invented certain new and useful Improvements in Hose Clamps; and I do hereby declare the following to be a full, clear, and exact description of the invention, such as will enable others skilled in the art to which it appertains to make and use the same.

My invention relates to endless clamps and means for contracting the same, intended for general use, but is especially adapted for use as a hose clamp, and to this end, it consists of the novel devices and combinations of devices hereinafter described and defined in the claims.

In the accompanying drawings, which illustrate the invention, like characters indicate like parts throughout the several views.

Referring to the drawings:—

Fig. 1 is a fragmentary side view of a hose secured to a hose or pipe, by means of my improved clamp;

Fig. 2 is an edge elevation of the improved clamp removed from a hose and shown in a released position by means of full lines, and in a clamping position by means of broken lines;

Fig. 3 is a plan view of the clamp as shown by means of broken lines in Fig. 2;

Fig. 4 is a fragmentary plan view of the clamping band and attached head and ears in blank form;

Fig. 5 is a plan view of the lever, toothed segments and pawl in blank form; and Fig. 6 is a view corresponding to Fig. 4, but illustrating a slight modification in which the head is integral with the clamping band.

The numeral 7 indicates a hose coupling or pipe onto which is telescoped one end of a hose 8, and secured thereto by one of my improved clamps. This clamp, as shown, comprises a flat flexible metal band or strap 9, one end portion of which is transversely folded to form a multiplicity of longitudinally spaced teeth 10. A transverse head 11 is detachably applied to the other end of the band 9, as shown in Figs. 1 to 5, inclusive, and in Fig. 6, said head is shown integral with the band 9. As one means of detachably securing the head 11 to the band 9, there is formed in said head, two transverse slots 12, through which said band is inserted, as best shown in Fig. 2, and the respective end of said band has a laterally outstanding lock lug 13 seated in a notch 14 in the head 11 to prevent the band 9 from pulling the slots 12 under the clamping action of the band 9.

The head 11 is formed from a single piece of sheet metal, and integral therewith is a pair of outstanding laterally spaced ears 15 in which is formed a pair of axially aligned seats 16, and on the peripheries of said ears are ratchet teeth 17. For co-operation with the teeth 10, to adjustably connect the ends of the band 9, there is provided a pair of laterally spaced toothed segments 18 having pressed therefrom, short tubular trunnions 19 journaled in the seats 16. These toothed segments 18, together with an operating lever 20, are formed from a single sheet of sheet metal. Also formed with the lever 20, is a yielding pawl 21 arranged for co-operation with the ratchet teeth 17 to hold the toothed segments 18, and thereby secure the band 9 in different contracted adjustments. At each edge of the pawl 21 is a finger piece 22 by means of which the said pawl may be sprung out of interlocking engagement with the ratchet teeth 17. The trunnions 19 may be removed from their seats 16 by simply springing the ears 15 laterally away from each other.

The band 9 is preferably made from metal having sufficient spring therein to normally lie straight. To apply the improved clamp to a hose, the band 9 is folded therearound and its tooth-equipped end inserted between the ears 15 under the toothed segments 18 while the same are held positioned, as shown in Fig. 2. The band 9 is then contracted by hand, as tightly as possible, onto the hose 8. The lever 20 is then moved into a position, as shown by broken lines in Fig. 2, to carry the toothed segments 18 into interlocking engagement with the teeth 10 and thereby contract the band 9 onto the hose 8 under the rotary action of said toothed segments.

What I claim is:—

1. A clamp comprising a band having at one end a plurality of teeth, a toothed segment journaled to the other end of the band for co-operation with said teeth to adjustably connect the ends of the band, and a pawl and ratchet for holding the toothed segment in different adjustments.

2. A clamp comprising a band having at one end a multiplicity of teeth, a head detachably secured to the other end of the band by direct interlocking engagement, and a toothed segment journaled to said head for co-operation with said teeth to adjustably connect the ends of the band.

3. A clamp comprising a band having at one end a plurality of teeth and at its other end a pair of laterally spaced ears, at least one of which is provided with ratchet teeth, and a lever journaled to said ears and having a toothed segment for co-operation with said teeth, said lever also having a pawl for co-operation with said ratchet teeth.

4. A clamp comprising a band having at one end a plurality of teeth and at its other end a pair of laterally spaced ears provided with ratchet teeth, and a lever having a pair of laterally spaced toothed segments for co-operation with said teeth, said lever also having a pawl for co-operation with said ratchet teeth.

5. A clamp comprising a band having at one end a plurality of teeth and at its other end a head with a pair of laterally spaced ears provided with ratchet teeth, said band, teeth, head and ears being formed from a pressed metal, and a lever having a pair of laterally spaced toothed segments journaled to said ears for co-operation with said teeth, said lever also having a yielding pawl for co-operation with said ratchet teeth, said lever, toothed segments and pawl being formed from sheet metal.

In testimony whereof I affix my signature.

JOHN SEVERIN ANDERSON.